May 22, 1923.

J. R. WILSON

ANIMAL TRAP

Filed Oct. 11, 1921

INVENTOR.
J.R. Wilson

ATTORNEY.

May 22, 1923.

J. R. WILSON

ANIMAL TRAP

Filed Oct. 11, 1921

INVENTOR.
J. R. Wilson

ATTORNEY.

Patented May 22, 1923.

1,456,415

UNITED STATES PATENT OFFICE.

JOSEPH R. WILSON, OF SALT LAKE CITY, UTAH.

ANIMAL TRAP.

Application filed October 11, 1921. Serial No. 506,974.

*To all whom it may concern:*

Be it known that I, JOSEPH R. WILSON, a citizen of the United States, residing at Salt Lake City, in the county of Salt Lake and State of Utah, have invented certain new and useful Improvements in an Animal Trap; and I do hereby declare the following to be a full, clear, and exact description of the invention, such as will enable others skilled in the art to which it appertains to make and use the same.

The invention relates to traps of the type embodying spring actuated pivoted jaws and lock means for holding the jaws open against the tension of the closing spring and including a trigger for releasing the jaws which close by a snap action.

The present invention provides a trap of the type stated wherein the jaw actuating spring is of substantially U-form and has the corresponding ends of the jaws pivoted thereon and connected by toothed cam portions which effect a spreading of the legs of the spring as the jaws are opened.

The invention also provides a novel lock mechanism including a main and supplemental latch for holding the jaws in open position and a trigger having connection with the bait by means of the strand and in cooperative relation with the guide.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification;

Figure 5 is a detail view of the frame for the lock mechanism.

Corresponding and like parts are referred to in the following description and designated in the several views of the drawings by like reference characters.

Figure 1:
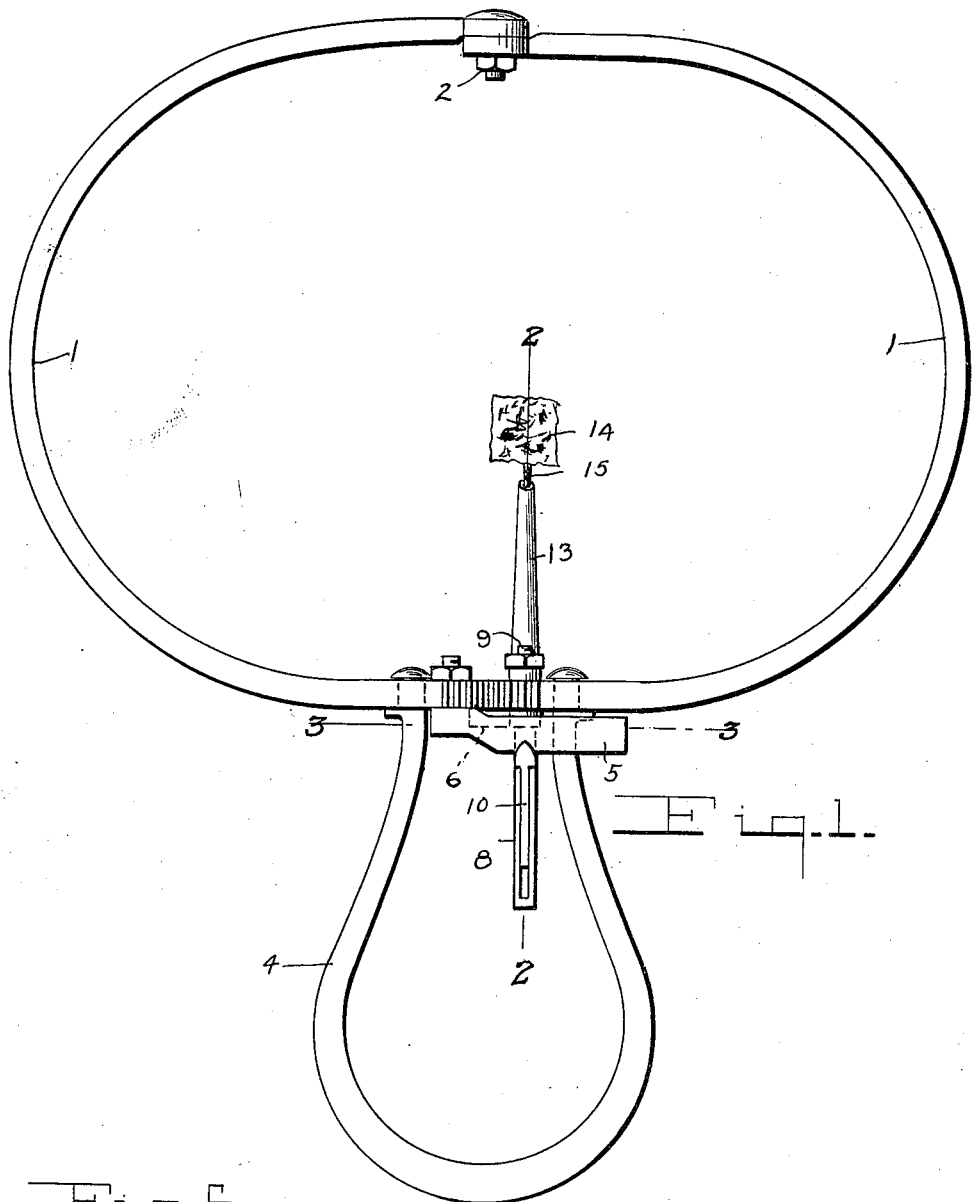
Figure 1 is a top plan view of a trap embodying the invention, the jaws being in open position.
Figure 2:
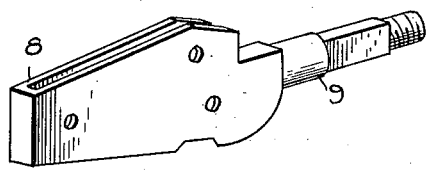
Figure 2 is a sectional detail on the line 2—2 of Figure 1.

The trap comprises similar jaws 1 of bow form. The jaws 1 have corresponding ends overlapped and pivotally connected by means of a bolt 2 or like fastening. The opposite ends of the jaws 1 terminate in cams 3 which are toothed and lie in the same plane. The teeth intermeshing. The spring 4 of substantially U-form connects the toothed cam ends 3 of the jaws. The elements of the U-spring 4 terminate in journals upon which the jaws are pivotally mounted. The spring 4 is normally under tension and serves to hold the jaws 1 closed. Upon opening the jaws 1 the tension of the spring 4 is increased. This is due to the action of the toothed cam ends 3 which effect a spreading of the leg or side members of the spring 4 as will be readily understood. The U-spring 4 is preferably disposed outwardly from the jaws 1 and is substantially in the plane thereof when the jaws are open. This results in an extended support for the trap and moreover provides in effect the handle whereby the same may be safely manipulated. It is further observed that the spring constitutes a guard for the lock mechanism.

Figure 3:
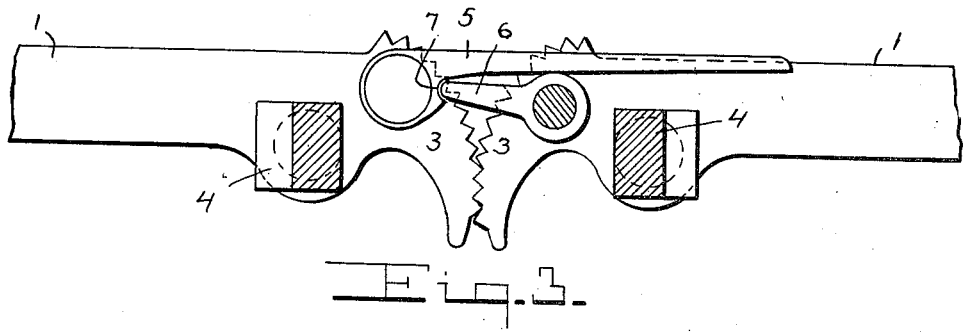
Figure 3 is a transverse section on the line 3—3 of Figure 1, the jaws being open.
Figure 2:
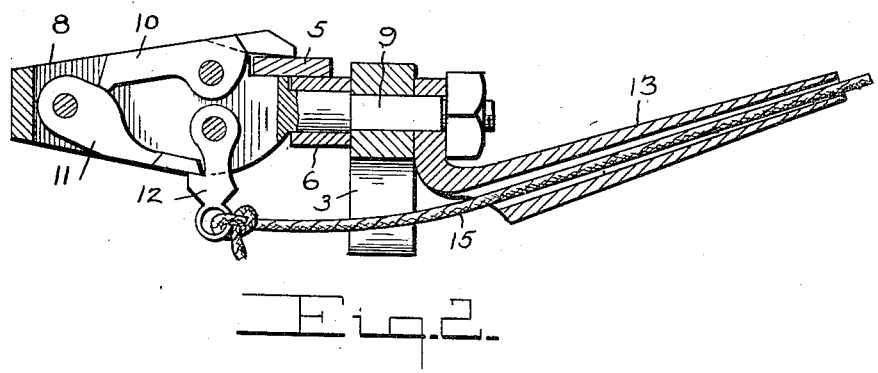
Figure 4:
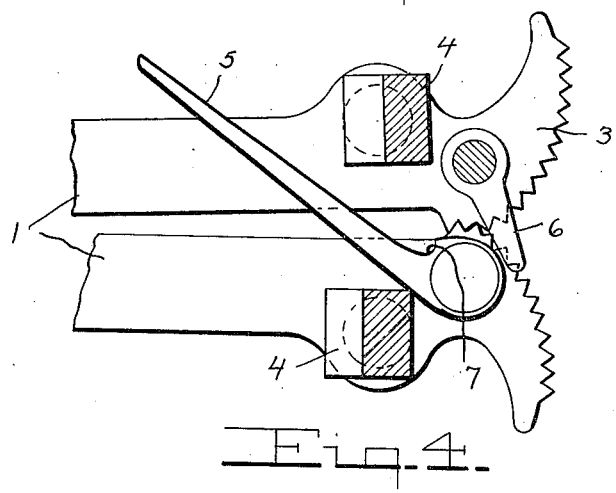
Figure 4 is a view similar to Figure 3, the jaws being closed.

A main latch 5 is pivoted to the toothed cam 3 of one of the jaws and adapted to be engaged by the lock mechanism carried by the toothed cam 3 of the companion jaw whereby to hold the jaws open when the trap is set. A supplemental latch 6 is pivoted to the toothed cam 3 of the jaw provided with the lock mechanism and cooperating with the main latch 5. The hub of the main latch 5 is provided with a notch 7 which receives the end of the supplemental latch 6 when the parts are in operative position to hold the jaws open. This is indicated most clearly in Figure 3.

The lock frame 8 is formed with the shank 9 which is received in an opening formed in the end 3 of the jaw supporting the same. A detent 10 is pivoted to the frame 8 and is adapted to engage over the main lock 5. A catch 11 pivoted to the frame 8 is adapted to engage the detent 10 and hold the same in operative position. A trigger 12 is pivoted to the frame 8 in cooperative relation with the catch 11 to hold the same in operative position. A guide 13 is mounted upon the inner end of the shank 9 and extends inwardly some distance to admit of the bait 14 occupying an approximate central position when the trap is set. The supplemental latch 6 is likewise mounted upon the shank 9. A strand 15 such as a cord extends through the guide 13 and is connected at one end to the trigger 12 and has the bait 14 secured to its opposite end. A pull upon the bait 14 actuates the trigger 12 whereby the catch 11 is released and moves to a position to liberate the detent 10 which assumes a position to release the latches 5 and 6 whereby the spring 4 being released from all restraint comes into play to close the jaws 1 to trap the animal pulling upon the bait 14.

Having thus described the invention, what I claim is:—

1. A trap of the character specified, comprising complemental jaws of approximately bow form pivotally connected at one end, a substantially U-shaped spring arranged approximately parallel with the axis of the jaws and having the opposite ends of the latter pivotally mounted upon the respective members of the said spring and movable towards and away from each other with the ends of the spring when expanded and contracted, a latch for holding the jaws open against the tension of said spring, and a locking mechanism in cooperative relation with said latch.

2. A trap of the character specified, comprising complemental bow shaped jaws pivotally connected at one end and having cam portions at their opposite ends, an approximately U-shaped spring arranged substantially parallel with the axis of the jaws and having the cam ends of the latter pivotally mounted upon the respective members of the spring and movable therewith towards and away from each other when the spring is expanded or contracted, and means for holding the jaws open against the tension of the said spring.

3. A trap of the character specified comprising bow shaped jaws having one end pivotally connected and their opposite ends terminating in toothed cams disposed with the teeth in meshing relation and a substantially U-shaped spring connecting the cam ends of the jaws, and means for holding the jaws open against the tension of the spring.

4. A trap of the character specified comprising complemental jaws pivotally connected, a spring normally tending to close the jaws, a main latch pivoted on one of the jaws, a supplemental latch pivoted on the companion jaw and adapted to engage the main latch and a locking mechanism in cooperative relation with the mechanism in cooperative relation to hold the jaws in open position when the trap is set.

5. In a trap of the character specified comprising pivoted jaws, a spring normally tending to close the jaws, a lock mechanism including a trigger, a guide and a strand extending from the trigger and passing through the guide and adapted to have the bait attached thereto.

6. In a trap of the character specified comprising pivoted jaws, a spring normally tending to close the jaws, a lock mechanism mounted upon one of the jaws and including a frame having a supporting stem, a guide mounted upon the stem of the lock frame and a strand passing through said guide and attached at one end to the trigger and adapted to have the bail connected to the opposite end.

7. In a trap of the character specified including pivoted jaws, a spring in cooperative relation with the jaws, a latch and a lock mechanism in cooperative relation with the latch and comprising a pivoted detent, a pivoted catch and a pivoted trigger.

8. A trap of the character specified comprising pivoted jaws, an approximate U-shaped spring connecting one end of the jaws which are pivoted thereto, said spring being disposed outwardly, a lock mechanism protected by the spring including a trigger and an inwardly disposed guide, and a strand extending from the trigger and passing through the said guide and adapted to have the bait attached thereto.

9. A trap of the character specified comprising complemental bow shaped jaws each having one end pivotally connected and the opposite end terminating in toothed cams which have their teeth intermeshing, an outwardly disposed U-shaped spring connecting the cam ends of the jaws which are pivotally mounted thereon, a latch mounted upon one of the jaws, a lock mechanism mounted upon the companion jaw, and including a trigger and disposed to be protected by the said U-shaped spring and an inwardly disposed tubular guide to receive a strand by means of which the bait is connected to the trigger.

In testimony whereof I affix my signature in presence of two witnesses.

JOSEPH R. WILSON

Witnesses:
 DANIEL W. BAIN,
 JOHN K. HOLEN.